Feb. 6, 1968 O. E. RINGELHAAN 3,368,038

DI-PHASE RECEIVER AND REPEATER TERMINAL

Filed June 11, 1964

INVENTOR,
OTMAR E. RINGELHAAN.

BY Julian C. Keppler

ATTORNEY.

United States Patent Office 3,368,038
Patented Feb. 6, 1968

3,368,038

DI-PHASE RECEIVER AND REPEATER TERMINAL

Otmar E. Ringelhaan, Munich, Germany, assignor to the United States of America as represented by the Secretary of the Army Filed June 11, 1964, Ser. No. 406,644
3 Claims. (Cl. 178—88)

The invention described herein may be manufactured and used by or for the Government for governmental purposes, without the payment of any royalty thereon.

The present invention relates to reception and repeating of diphase signals, illustrated particularly in regard to differential diphase transmission of binary signals on a wire transmission channel.

Code transmission involves various coding rules as to detailed relation between data and transmitted wave and various modulation rules as to general nature of transmitted wave on the channel. In general the coding rules are immaterial to the signal propagation, but the modulation rules may significantly affect the propagation. For example:

(a) If a quasi-random coded train of spikes selected from regularly clocked spikes is applied to a *delay* two-state "one-shot" or monostable circuit corresponding to the clock interval it converts each spike to a rectangular pulse, immediate successive pulses being joined, but if applied to a complementing two-state "flip-flop" or bistable circuit (no interval involved) it converts each spike to a change from pulse to no-pulse or from no-pulse to pulse. Both are quasi-random rectangular binary signals of like information content (although based on different coding rules) and may be transmitted in the same manner (using any of several modulation rules).

(b) The binary mode of transmission may be used for either, or some other mode such as biternary modulation; which has advantages in reducing required channel bandwidth.

(c) Certain combinations of coding and modulation rules are often advantageous, as: a delay two-state, binary channel, and mere sampling restores the same coded train of spikes; or a complementing two-state, "half channel" (saving required transmission bandwith by biternary mode of operation), absolute value detector, and "zero" mode sampling also restores the same coded train of spikes. Thus the proper choice of coding minimizes the need for additional conversions in code form, although these conversions are rather simple anyway.

(d) In the case of dicode and bipolar the coding rules are identified by separate names although the modulation rules are identical for both. Either has advantage in reducing low frequency components, but not bandwith; in the case of bipolar the decoding is almost identical to the biternary form noted above.

In the present case the signal involves a basic wave, of frequency corresponding to the clock rate, which is phase reversed at each coded spike and then continued without phase reversal until the next spike, known as differential diphase. If the phase were restored to normal in the absence of a new spike at the clock time, rather than continued until a new spike, it would be considered merely diphase. Both involve the same modulation rules and propagation characteristics. The wave is rectangular and so timed relative to the spikes that each such spike eliminates a voltage level change. Thus a series of spikes change the wave form to a square wave of frequency half that of the basic wave and clock rate.

When transmitted through a typical low-pass channel whose phase characteristics is properly equalized the higher frequency components are suppressed more than the lower frequency components and the original spikes therefore produce higher peaks (of either polarity) at the output. By full wave rectification these peaks may be converted to a like polarity convenient for decoding. This also produces a very convenient higher frequency synchronizing component corresponding to *double* the clock rate, which may be readily isolated by a filter and is substantially continuous in spite of phase reversals of the original square wave, particularly if the peak amplitudes for the lower frequencies are about five times those for the higher frequencies. If this synchronizing signal is also subtracted from the rectified wave the lower frequency peaks are further emphasized and the higher frequency ripple reduced to improve the separation between the levels used for decoding. Furthermore, if the synchronizing signal and decoded signal, both converted to rectangular form, are combined in an OR gate, transitions of one polarity correspond to transitions of both polarities in original transmitted waves, except for incidental delays of no importance, and thus may be readily used to produce a repeated wave for the next channel section.

The present invention is particularly applicable, but not limited, to cables with attached repeater terminals to be placed from a low flying aircraft. Excessive size of repeater would unduly hamper the air-laying techniques. The repeater functions discussed are duplicated for two-way operation and for practical use require other conventional components not directly concerned with the invention, such as means to isolate the power supply (for the solid state amplifiers and other components) transmitted over the same cable, fault checking means, the two-way coupling networks, etc. By using conventional solid state components a complete repeater terminal of approximately 3″ diameter and 12″ length is readily obtained following the present invention; further miniaturization can be considerably extended by techniques already available. The signal to noise ratio is extremely favorable for the information signal, and the timing extraction from the wave as taught herein is unusually stable. Typically operation may involve a 2.3 mc. square wave carrier, with alternate transitions eliminated in the presence of "mark" signals, thus involving 1.15 mc. square waves at such times. This is merely illustrative and may be widely varied according to the particular system.

The Warnock Patent 3,008,124 shows a typical prior application of diphase (or bi-phase). FIGS. 11 to 14 are not realistic as to actual wave forms, but cause no particular difficulty in analysis of the operation. This fails to show the differential diphase mode, of minor importance, but also fails to show the present improved techniques for synchronizing the receiver, for more reliably separating the mark and space signal levels, and for repeating the signal to further channel sections.

The invention is illustrated by the accompanying drawings in which.

Since most of the operations involve ordinary communication and computer logic circuits the drawings use various symbols generally corresponding to the logic symbols of U.S. Army MIL–STD–806B, such as:

(a) the almost universal D shaped shield for AND gate;
(b) a generally triangular shield with one concave and two convex sides for usual OR gate (with a double line on concave side in the case of an EXCLusive-OR group of gates);
(c) a mere triangular shield, as a large arrowhead, for any significant amplifiers not merely implied as part of other elements (in the present case including certain phase corrections to compensate channel characteristics);
(d) a small circle (or half circle to distinguish from other uses of a circle) for NOT or INHibit inputs or outputs of gates, etc.;

(e) a rounded end narrow rectangle for a delay device;

(f) a wide rectangle (suggestive of the two alternative "sides") for a two-state (binary) stable or quasi-stable circuit, such as a flip-flop. This characteristic of such two-state sides is often further emphasized by a dotted divider line with:

(g) outputs from either or both sides;

(h) ordinary inputs to either or both sides;

(i) complement or count input at such divider line (implying the gating function of such an input, and for sequential inputs permitting use somewhat analogous to EXCLusive-OR gates);

(j) an "X," suggestive that an input is non-essential to the particular side (as the stable side of mono-stable or in both sides of a-stable circuits, which may also have an ordinary supplemental input for such purposes as synchronizing);

(k) a common input, direct to one side and thru a NOT circuit to the other side, suggestive of Schmitt trigger operation (a binary output but not strictly binary input).

In place of word legends, eliminated by the symbol form, numerals or letters indicate time of instability in terms of clock pulse intervals, or operating levels of Schmitt trigger circuits. Certain further symbols are substantially self-explanatory such as the LC tank circuit for filtering a particular frequency, the Greek sigma for a summing (or subtracting) circuit, and the pair of diodes for full wave rectification. The designation absolute value detector may be preferable to emphasize the actual output wave form, in which the D.C. component is of secondary importance and the ripple essential, whereas a rectifier in the power supply sense commonly includes a low-pass filter to minimize the ripple and use the D.C. component.

Figure 1:
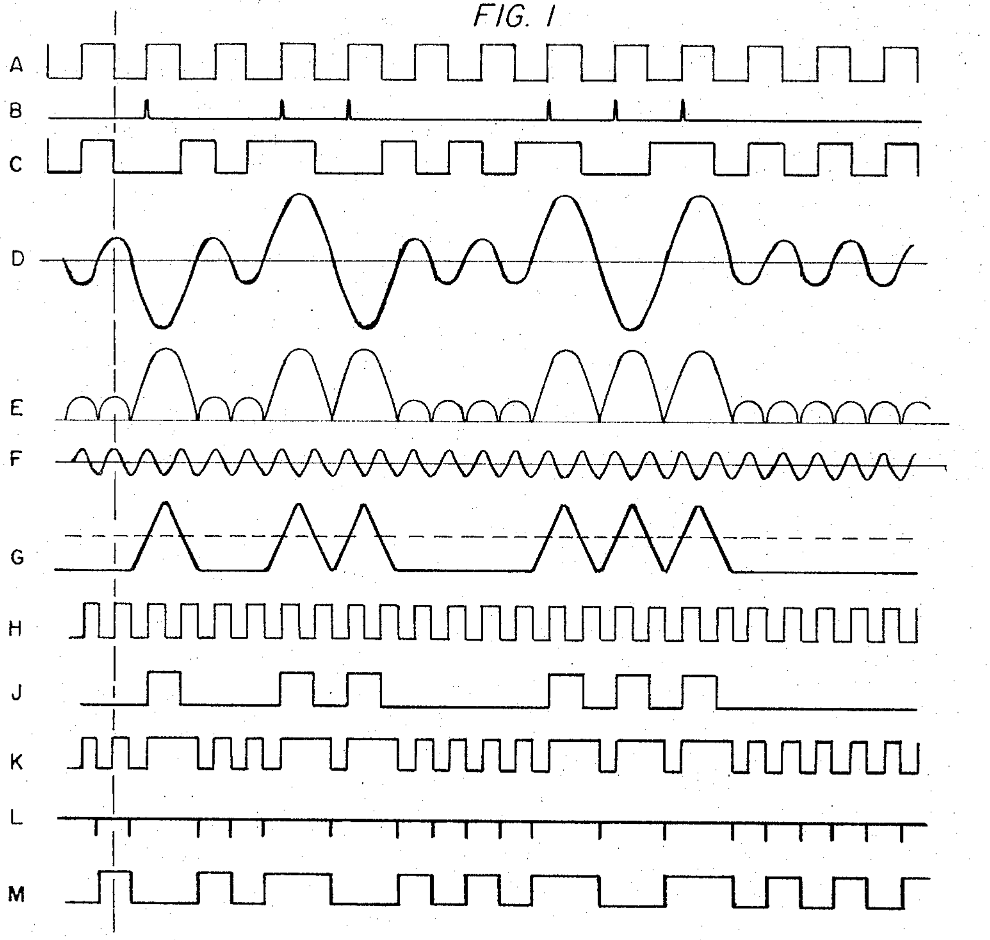
FIG. 1 represents typical wave forms involved in the operation.
Figure 2:
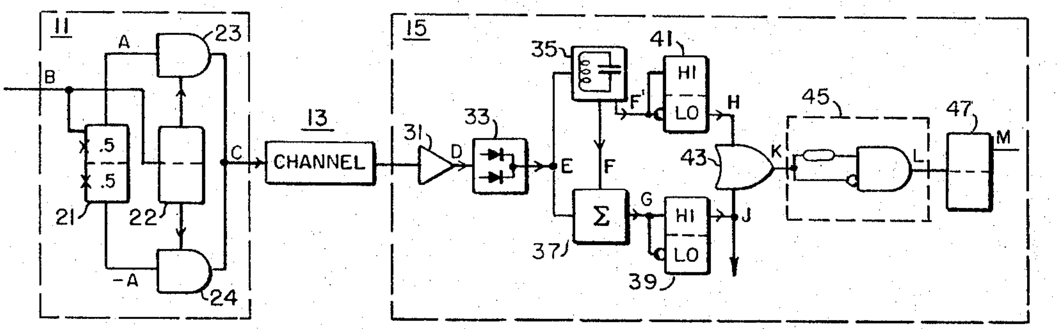
FIG. 2 represents a suitable block diagram.

In FIGURE 2 a transmitter terminal 11 is connected through a channel 13 to a receiver terminal 15. At the transmitter an assumed clock signal involving spikes at regular intervals identifies the system clock rate. Certain of these pulses are omitted according to a prearranged code to transmit an information signal B (FIG. 1). A first two-state a-stable circuit 21 is arranged to change state at each half period of the clock rate of the system, without input and producing outputs A and —A; however, to keep properly synchronized input signal B is applied supplementally to this two-state circuit. Another complementing two-state bistable circuit 22 is arranged to change state at each spike of signal B applied to its complement input. Each output of two-state circuit 21 is combined with one output of two-state circuit 22 in AND gates 23 and 24, whose outputs are combined as signal C for transmission by the channel. Since both A and —A are square waves of like frequency and transition time but opposite polarity or "phase," as long as B has no spikes the output C will be either one. However when a spike of B changes the level of two-state circuit 22 at the same time two-state circuit 21 changes there is no change in output C to the channel at the time. Such situations are apparent in various parts of the wave forms A, B, C of FIGURE 1.

The channel 13 degrades this signal somewhat as indicated in D, suppressing the high frequency components more than the lower frequency components. An amplifier 31 in the receiver terminal 15 provides correction for phase distortion in the channel; its actual output is represented by D. This phase correction can be designed for the usual channels and does not require readjustment for each installation. No amplitude correction is required. This output is supplied to an absolute value detector 33, providing output E, which is supplied to two circuits. In filter 35, tuned to a ripple frequency double the clock rate because of the frequency doubling involved in full wave rectification or absolute value detection, a wave F corresponding to such ripple is extracted from E, and also is supplied to two circuits. In summing circuit 37 the two waves are combined in a proper polarity to substantially eliminate this ripple and also to peak the already higher pulses from the low frequency components, thus producing wave G. The analog levels of wave G are then distinguished by a Schmitt trigger type two-state circuit 39 to produce a true binary two level output signal J, corresponding to the spikes of input B but with pulses of width equal to half the clock interval. As previously noted this same frequency component is available in proper phase after absolute value detection either as a relatively strong second harmonic of the attenuated high frequency component or relatively weaker fourth harmonic of the stronger low frequency component. In either case it provides suitable retiming, and at generally similar amplitude levels.

The curve F in slightly different phase designated F′ is also converted to rectangular form H in another Schmitt trigger type two-state circuit 41, and combined with J in OR circuit 43 to form the wave K. This is supplied to transition circuit 45 shown as made up of delay and NOT connections to an AND gate to produce spikes L at each downward transition of wave K. Actually this circuit 45 is non-essential since the wave K applied thru usual input circuits would provide the same operation away. These spikes are supplied to another complementing two-state bistable circuit 47 arranged to change level at such spike L applied to its complement input, forming another rectangular wave M (corresponding to B) for further transmission. This restores accurate timing which may have been somewhat degraded in wave J. If circuit 47 happened to be in the opposite state when starting the output would be —M, but would have the same effect in the system; and the same reversal might also apply to curve C.

Although the system is described in terms of logic diagram and other common elements various equivalents and alternative circuits could readily be substituted. For example, an absolute value circuit is often made up of a pair of cathode followers with reverse phased inputs and a common cathode load, not readily recognized as rectifier elements although the result is similar. Similarly the filter might be of crystal, LC tank, or phase lock oscillator type; various clipping arrangements would provide the effects of the Schmitt triggers; and an RC differentatior circuit properly coupled to the bistable circuit 47 would have the same effect as the transition circuit 45.

The novelty lies within the receiver portion of the system, and the repeater aspects of the receiver used for retransmission over further channels of the system as a whole. The original transmitter portion and channel are merely to provide and appropriate signal to illustrate the overall operation of a complete system.

What is claimed is:

1. A receiver terminal for a diphase signal, comprising:

receiver input means for receiving a diphase signal produced from a carrier of frequency equal to a predetermined clock rate, said carrier being applied in direct or reversed phase under control of a binary information signal at said clock rate to produce other components of frequency half said clock rate, the combined direct and reversed waves involving resultant polarity transitions, and transmitted over a channel which attenuates said carrier components to an amplitude substantially less than said half frequency components, absolute value detector means to convert both polari ies of received signal to a common polarity, with high amplitude pulses corresponding to each change of carrier phase and low amplitude ripple corresponding to double the carrier frequency, means to extract the double frequency of said ripple and similar component of said pulses to provide a retiming wave for said receiver and means responsive to said high amplitude pulses to identify the information signal and convert it to a rectangular binary wave.

2. A receiver terminal for a diphase signal, produced from a carrier of frequency equal to a predetermined clock rate, said carrier being applied in direct or reversed phase under control of a binary information signal at said clock rate to produce other components of frequency half said clock rate, the combined direct and reversed waves involving resultant polarity transitions, and transmitted over a channel which attenuates said carrier components to an amplitude substantially less than said half frequency components, comprising:

absolute value detector means to convert both polarities of received signal to a common polarity, with high amplitude pulses corresponding to each change of carrier phase and low amplitude ripple corresponding to double the carrier frequency, means to extract the double frequency of said ripple and similar component of said pulses to provide a retiming wave for said receiver, means to subtract said extracted double frequency from said common polarity signal in proper amplitude to minimize said ripple and emphasize said high amplitude pulses, and means responsive to the separate levels of said subtracted wave to identify the information signal and convert it to a rectangular binary wave.

3. A repeater terminal including a receiver as in claim 2 and further means to produce a rectangular wave at the frequency of said extracted wave and to combine it with said identifying rectangular wave to produce a further retimed rectangular wave having transitions of one polarity corresponding to the transitions of either polarity in said transmitted wave, and means controlled by said one polarity transitions to produce a new wave having corresponding transitions of either polarity for further transmission.

References Cited

UNITED STATES PATENTS

| | | | |
|---|---|---|---|
| 1,559,642 | 11/1925 | Nyquist | 178—67 |
| 3,112,448 | 11/1963 | McFarlane et al. | 375—163 |

ROBERT L. GRIFFIN, *Primary Examiner.*

DAVID G. REDINBAUGH, *Examiner.*

B. V. SAFOUREK, *Assistant Examiner.*